US010924629B1

(12) United States Patent
Siagian et al.

(10) Patent No.: US 10,924,629 B1
(45) Date of Patent: Feb. 16, 2021

(54) TECHNIQUES FOR VALIDATING DIGITAL MEDIA CONTENT

(71) Applicant: Amazon Technologies, Inc., Seattle, WA (US)

(72) Inventors: Christian Garcia Siagian, Los Angeles, CA (US); Christian Ciabattoni, Los Angeles, CA (US); Yang Yu, Los Angeles, CA (US); Yik Pui Suen, Chino Hills, CA (US); Ryan Barlow Dall, Los Angeles, CA (US); Ritesh Pase, Seattle, WA (US); Ramakanth Mudumba, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/712,330

(22) Filed: Dec. 12, 2019

(51) Int. Cl.
*H04N 1/32* (2006.01)
*G06K 9/00* (2006.01)
*G06N 3/02* (2006.01)
*H04N 1/60* (2006.01)

(52) U.S. Cl.
CPC ..... *H04N 1/32144* (2013.01); *G06K 9/00281* (2013.01); *G06N 3/02* (2013.01); *H04N 1/6052* (2013.01)

(58) Field of Classification Search
CPC ............. H04N 1/32144; H04N 1/6052; G06K 9/00281; G06N 3/02
See application file for complete search history.

(56) References Cited

U.S. PATENT DOCUMENTS

| 8,763,023 | B1 * | 6/2014 | Goetz | H04N 21/233 |
| | | | | 725/20 |
| 10,182,271 | B1 * | 1/2019 | Sanchez | H04N 21/4821 |
| 2007/0204211 | A1 * | 8/2007 | Paxson | G06F 40/131 |
| | | | | 715/205 |
| 2008/0177781 | A1 | 7/2008 | Tan | |
| 2008/0292193 | A1 | 11/2008 | Bigioi et al. | |
| 2012/0106806 | A1 | 5/2012 | Folta et al. | |

(Continued)

OTHER PUBLICATIONS

Jaiswal et al., "CapsuleGAN: Generative Adversarial Capsule Network," Available online at: https://arxiv.org/abs/1802.06167, Accessed from Internet at Oct. 2, 2018, 10 pages.

(Continued)

*Primary Examiner* — Mishawn N. Hunter
(74) *Attorney, Agent, or Firm* — Kilpatrick Townsned & Stockton LLP

(57) ABSTRACT

Techniques for automated content validation are provided. In some examples, a media file and a metadata file associated with a title of the media file may be received. One or more scene paragraphs may be identified based at least in part on information in the metadata file. Scenes may be identified at least in part by using a transformer model implemented in a neural network. One or more scene files may be generated from the media file. One or more characters in a scene file of the one or more scene files may be identified. A match score may be determined, based at least in part on an association of the scene file to a scene paragraph of the plurality of scene paragraphs. A validity criterion may be determined for the title associated with the media file based at least in part on the match score.

20 Claims, 9 Drawing Sheets

(56) References Cited

U.S. PATENT DOCUMENTS

| | | | |
|---|---|---|---|
| 2012/0197930 A1 | 8/2012 | Newell et al. | |
| 2015/0082330 A1* | 3/2015 | Yun | H04N 21/26603 |
| | | | 725/14 |
| 2016/0048723 A1* | 2/2016 | Jeong | G06K 9/00268 |
| | | | 382/197 |
| 2016/0093022 A1 | 3/2016 | Lee et al. | |
| 2016/0142794 A1* | 5/2016 | Yoo | H04N 21/4394 |
| | | | 386/282 |
| 2019/0251363 A1* | 8/2019 | Kim | G06T 7/194 |
| 2019/0347478 A1 | 11/2019 | Sorci et al. | |
| 2020/0125600 A1* | 4/2020 | Jo | G06K 9/00369 |

OTHER PUBLICATIONS

Sabour et al., "Dynamic Routing Between Capsules," 31st Conference on Neural Information Processing Systems, Available online at: https://arxiv.org/abs/1710.09829, Accessed from Internet at Nov. 7, 2017, 11 pages.

U.S. Appl. No. 16/712,294, "Techniques for Up-Sampling Digital Media Content," filed Dec. 12, 2019, 42 pages.

* cited by examiner

TECHNIQUES FOR VALIDATING DIGITAL MEDIA CONTENT

CROSS-REFERENCE TO RELATED APPLICATIONS

This application is related to U.S. Non-Provisional application Ser. No. 16/712,294, filed Dec. 12, 2019, entitled "TECHNIQUES FOR UP-SAMPLING DIGITAL MEDIA CONTENT," the disclosure of which is incorporated by reference herein in its entirety for all purposes.

BACKGROUND

Digital media libraries contain volumes of digital media content. Some digital media content may include audiovisual content, such as digital video or digitized films. Media content may be available accompanied by metadata associated with the media content. Some digital media content may be associated with a title in a digital media library interface, such as an online browser or index, that does not accurately reflect the digital media content. Misattributed title information impairs a user's ability to access digital media content and requires search and reattribution of title information.

BRIEF DESCRIPTION OF THE DRAWINGS

Various embodiments in accordance with the present disclosure will be described with reference to the drawings, in which.

DETAILED DESCRIPTION

Figure 1:
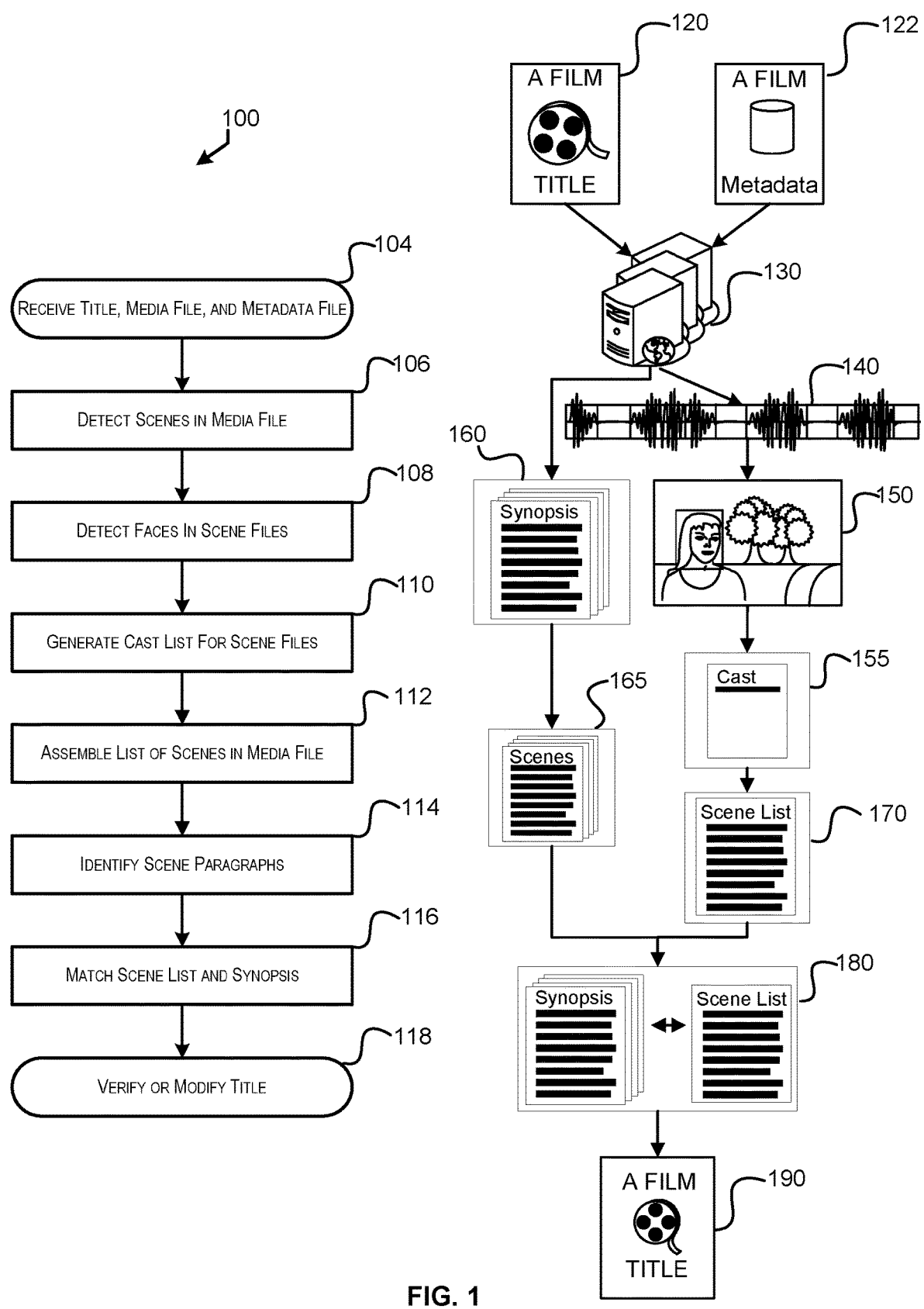
FIG. 1 is a block diagram illustrating an example technique for automated validation of digital media content, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In online digital streaming applications, misattributions of title information seriously impair the viewing experience of streaming customers. Overall, defects related to serving misattributed digital media content to streaming customers is a leading cause of customer contacts to support and service contact lines annually. At present, title information is manually validated against a textual synopsis or based on familiarity with the digital media content.

Techniques described herein provide for automated validation techniques that utilize audio, language, and visual understanding to automatically detect misattributed title information in digital media libraries. That is, the algorithm can extract the primary characters of each scene in a media file and match the resulting list with a synopsis associated with the title, paragraph per paragraph. In some embodiments, the automated validation techniques can correct misattributed title information.

As an illustrative example, a user of a digital media library on a user device, such as a mobile device or a personal computer, may select a movie or television episode to view through a browser or other user interface on the user device. The user interface may include an image and title text describing the content, for example, an image of a lead character or a title card. The user may find that the movie or episode that plays in the browser is not the content that the user selected. For example, the user may select a particular episode in an episodic series by its title, but the content that plays is associated with a different episode in the series. Similarly, the user may select a particular film, only to have a different film play. Defective title attribution in a digital media library makes it nearly impossible for the user to correctly select the particular episode or film, because, for example, the only avenue available to select digital media content depends on the title and title card being valid.

As a further example, an automated validation technique for checking title attribution in a digital media library can be designed to automatically verify if a title associated with a media file is accurate. To do so, the system first identifies the scenes in the media file, which may be based on the audio track of the digital media content. The audio track of a film or television episode typically contains scenes having different sound profiles. The system may find those differences and define scenes in the media file where they are found. The system may then process the video track of the media file to identify the characters that appear in each of the scenes by facial recognition.

Identification may be based on a file of images included in a metadata file, for example, a database of movie information, containing movie stills and character photos of the characters appearing in the digital media content. Similarly, the metadata file may include a synopsis in written form that describes the plot of the film or television episode. The system may process the synopsis to identify which paragraphs correspond to the scenes in the plot, so that the system may determine which characters appear in the scenes of the synopsis. This process may be done separately from the processing of the media file, because it may be that the media file and the metadata are misattributed to the same title.

The system may compare the scenes in the synopsis to the scenes in the media file based at least in part on which characters appear in each scene, and calculate a score for how well the media file matches the synopsis. The system can decide whether the two are correctly attributed to the same title by comparing the score to a cut-off value indicating an acceptable level of match. If the score doesn't meet the cut-off, the system may modify the title, for example, to indicate that it is invalid and/or to correct the title.

FIG. 1 is a block diagram illustrating an example technique for automated validation of digital media content, in accordance with at least one embodiment. To validate digital media content, a service provider computer 130 may receive a title, a media file 120 associated with the title, and a metadata file 122 associated with the title, as shown in operation 104. In some embodiments the media file 120 may be segmented into one or more scenes. In some embodiments, the service provider computer 130 may detect and separate an audio file 140 from the media file 120, detect and partition the audio file 140 into segments that correspond to the scenes in the media file 120, and generate corresponding scene files 150 from the visual content of the media file 120, as shown in operation 106. The service provider computer 130 may detect and recognize faces (e.g., human faces, animal faces, or any region of an object that can reasonably be used to identify the object) in the one or more scene files 150, shown in operation 108, enhanced by metadata from the metadata file 122 including images of characters and actors appearing in the film. The service provider computer 130 may generate one or more media cast lists 155 for the scene files 150, as shown in operation 110. In some embodiments, the service provider computer 130 assembles the one or more media cast lists 155 into a scene list 170 having one or more entries, wherein the entries in the scene list 170 are arranged in a sequence corresponding to the order of the one or more scene files 150 segmented from the media file 120 in operation 106, as shown in operation 112. In some embodiments, the service provider computer 130 identifies one or more scene paragraphs 165 corresponding to textual scene descriptions in the textual synopsis 160, as shown in operation 114. In some embodiments, scene paragraphs 165 contain the cast and characters mentioned in the textual synopsis section corresponding to a scene, where the positions of one or more scene transitions in the textual synopsis 160 are determined by natural language processing algorithms implemented in a machine learning model, as described in more detail, below. In some embodiments, a match between the media file 120 and the metadata file 122 is assessed at least in part on the basis of the scene list 170 by matching entries in the scene list 170 to scene paragraphs 165 generated from the textual synopsis 160, as shown in operation 116. In operation 116, the service provider computer 130 may generate a match criterion, at least in part by which the service provider computer 130 may validate or modify the title attributed to the media file 120, as shown in operation 118. Each of the preceding operations may be completed automatically by the service provider computer 130, as described in more detail, below.

Figure 2:
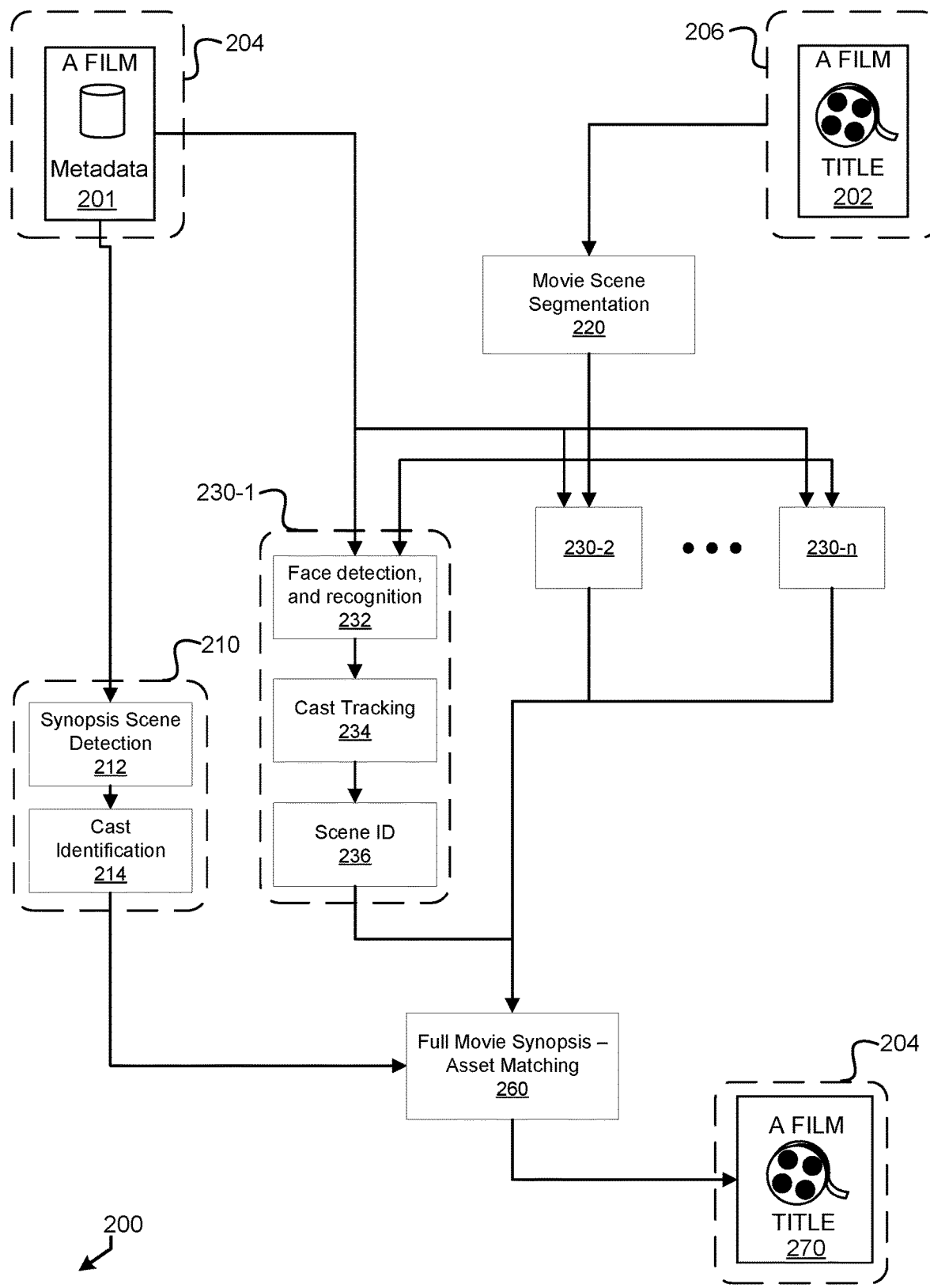
FIG. 2. is another block diagram illustrating another example technique for automated validation of digital media content, in accordance with at least one embodiment.

FIG. 2. is another block diagram illustrating another example technique for automated validation of digital media content, in accordance with at least one embodiment. In some embodiments, a media file 202 is received from a first database system 204. In some embodiments, a metadata file 201 is associated with the media file 202, and is received from a second database system 206. The metadata file 201 may be received from the first database system 204. In some embodiments, the media file 212 is received by a service provider computer (e.g. the service provider computer 130 of FIG. 1) and processed in a movie scene segmentation module 220. The movie scene segmentation module 220, discussed in more detail in reference to FIG. 3, below, may generate an audio file (e.g. the audio file 140 of FIG. 1) and a video file from the media file 202, and, via analysis of the audio file, segment the media file 202 into one or more scene files. In some embodiments, the movie scene segmentation module 220 segments the media file 212 into one or more scene files based at least in part on analyzing the video file directly. The movie scene segmentation module 220 may determine a scene transition at least in part by detecting one or more faces and background features and comparing changes in one or more of the faces over time. Alternatively, the movie scene segmentation module 220 may determine scene transitions at least in part by detecting dark segments in the video file corresponding to scene transitions (e.g. a fade-to-black type cut or a cut between scenes that features a dark screen for a given duration).

In some embodiments, a synopsis scene module 210 takes in the metadata file 201 associated with the title of the media file 202, including a textual synopsis (e.g., the textual synopsis 160 of FIG. 1), a list of cast and characters appearing in the media file associated with the title, and one or more images of cast and characters appearing in the media file associated with the title. In some embodiments, the synopsis scene module 210 processes the textual synopsis in a synopsis scene detection module 212 to detect one or more scene paragraphs in the textual synopsis, as described in more detail in reference to FIG. 5. The synopsis scene module 210 may process the textual synopsis in a cast identification module 214, to identify cast and characters appearing in each of the scene paragraphs as described in reference to FIG. 1 (e.g. the synopsis cast lists 165 of FIG. 1) for further application in scene-synopsis matching as described in reference to FIG. 5.

In some embodiments, a scene character recognition module 230-1 takes in a scene file and metadata from the metadata file 201. In some embodiments, the scene character recognition module 230-1 processes the scene file to detect and recognize faces in the scene file in a face detection, recognition, and tracking module 232, as discussed in more detail in reference to FIG. 4, below. In some embodiments, face detection, recognition, and tracking module 232 includes a facial recognition engine, and limits tracking of detected faces to faces associated with characters identified in the metadata file 210. In this way, computational resources are conserved, thereby optimizing the efficiency of the validation technique. In some embodiments, the face detection and recognition module limits tracking of detected faces based at least in part on the duration of time during which a character is visible in the scene. For example, a character visible in the scene for 30 seconds or more may be considered a principal character in the scene, and may be tracked. In another example, a face visible in a scene for five seconds or less may not be a principal character in the scene, and may not be tracked by the automated validation technique 200. In some embodiments, the scene file includes a plurality of frame images in a sequence, as described in reference to FIG. 4, below. The face detection and recognition module may limit tracking of detected faces based at least in part on the number of frame images in which a character is detected in the scene, providing an analogous measure to duration of time when accounting for a sampling rate, as described in more detail, below. In some embodiments, after face detection and recognition, the scene character recognition module 230-1 generates a list of characters appearing in the scene file, by a cast tracking module 234, as described in reference to FIG. 1 (e.g., the media cast lists 155 of FIG. 1).

In some embodiments, the scene files are processed in parallel by a plurality of scene character recognition modules 230-2-230-n implemented in one or more processors of the service provider computer (e.g. the service provider computer 130 of FIG. 1), where "n" is an integer indicating the number of modules implemented in the automated validation technique.

In some embodiments, a full movie synopsis-asset matching module 260 matches each of the scene files to a scene paragraph in the textual synopsis generated in the synopsis scene module 210, based at least on the scene identification generated in the scene ID module 236 of the one or more scene character recognition modules 230-1-230-n. In addition to matching each of the one or more scene files to a scene paragraph in the textual synopsis, the full movie synopsis-asset matching module 260 generates a final matching score, such that the quality of the association between the title and the media file 202 is determined, as described in more detail in reference to FIG. 5. The final matching score may exceed a pre-defined threshold value, in response to which the service provider computer (e.g. the service provider computer 130 of FIG. 1) may modify the title associated with the media file 270 in the first database system 204. In some embodiments, the final matching score is less than a pre-defined threshold value, in response to which the service provider computer (e.g. the service provider computer 130 of FIG. 1) may validate the title associated with the media file 270 in the first database system 204.

Figure 3:
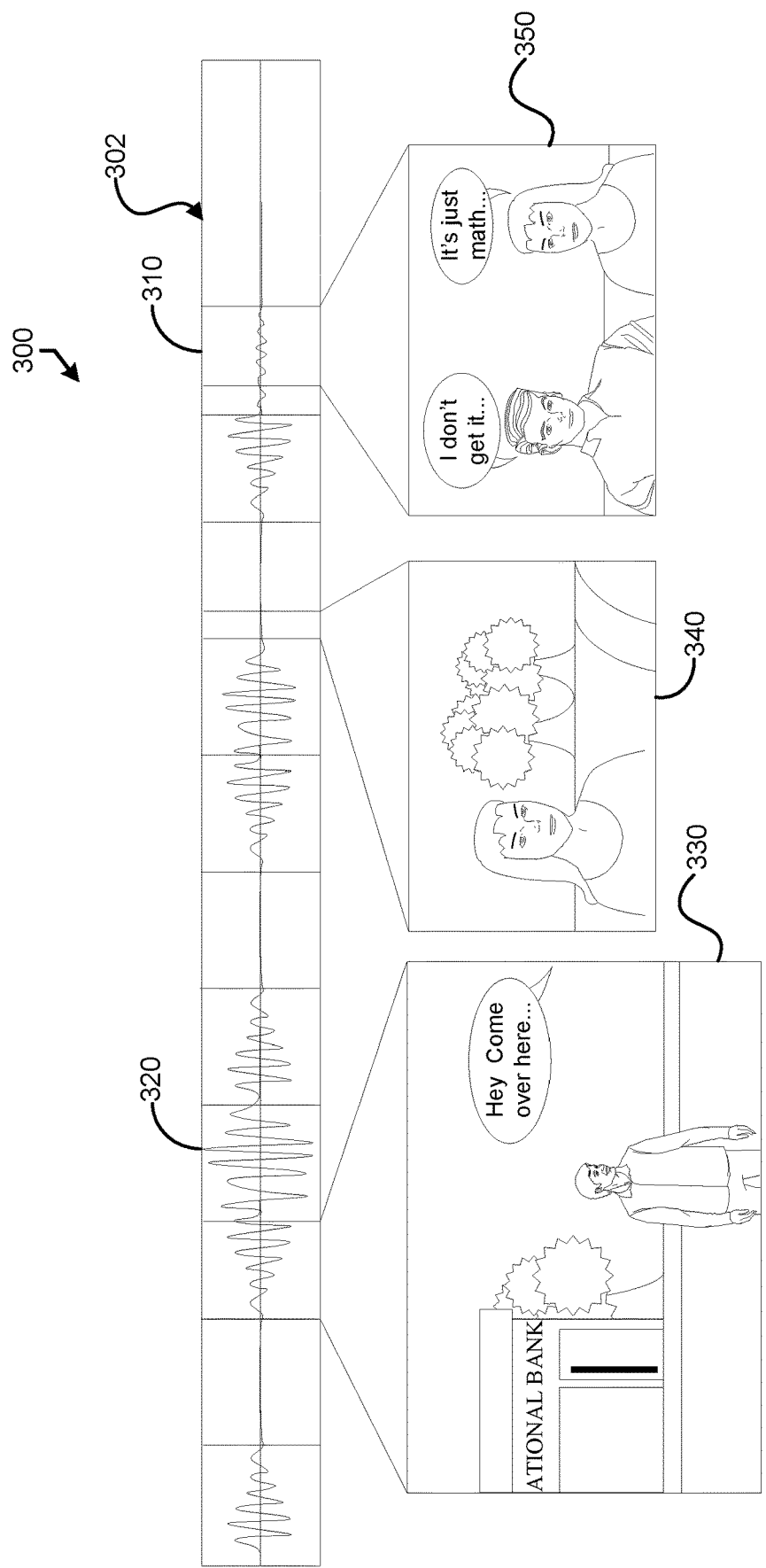
FIG. 3. is a diagram illustrating an example technique for movie scene segmentation, in accordance with at least one embodiment.

FIG. 3. Is a diagram illustrating an example technique for movie scene segmentation, in accordance with at least one embodiment. In some embodiments, as described in reference to FIG. 2, the automated validation technique (e.g. the technique 200 of FIG. 2) includes a movie scene segmentation technique 300, which generates an audio file 302 from a media file (e.g. the media file 202 of FIG. 2). In some embodiments, the movie scene segmentation technique 300 partitions the audio file 302 into scenes by classifying one or more quiet segments 310 of the audio file (e.g., low volume) and one or more loud segments 320 (e.g., high volume). A distinction between "quiet" and "loud" may be based at least in part on an intensity threshold value, above which a segment is classified as "loud." The distinction may also be based on clustering of segments based at least in part on a separation criterion. In some embodiments, the movie scene segmentation technique 300 may classify one or more quiet segments 310 or one or more loud segments 320 at least in part by implementing one or more spectrum analysis techniques including, but not limited to, mel-frequency cepstrum, spectrum energy, and/or Fourier transform. The movie scene segmentation technique 300 may be implemented at least in part using a neural network, such that the separation criterion between quiet segments 310 and loud segments 320 is optimized.

The movie scene segmentation technique 300 may include an implementation of a Support Vector Machine (hereinafter referred to as "SVM"), stored in a computer readable memory as computer-executable instructions. In some embodiments, a SVM is a machine-learning model associated with one or more learning algorithms used for classification and regression analysis. The SVM may be implemented as a supervised learning model, trained based at least in part on a set of training data including pre-classified quiet segments and loud segments generated from one or more media files available in the database of media files (e.g. the first database system 204 of FIG. 2). In some embodiments, the SVM implements a two-dimensional linear classification without a pre-classified dataset of quiet segments and loud segments (e.g., being implemented as an unsupervised learning model), wherein the SVM detects clusters of segments and maps the segments to two or more groups (e.g. by the support-vector clustering algorithm).

In some embodiments, the movie scene segmentation technique 300 smooths the one or more quiet segments 310 across a smoothing window corresponding to the length of a typical scene transition (e.g., in a range of one to ten minutes in duration), which may depend on characteristics of the media file associated with the audio file 302, such as genre, platform, content type, filmmaker and the like. For instance, in critically-acclaimed drama films, average scene duration is typically prolonged relative to that of fast-paced action films. In another instance, an individual filmmaker may be associated with longer than average scene durations. In some embodiments, the movie segmentation technique 300 may define the smoothing window at least in part based on information provided in a metadata file associated with the media file (e.g. the metadata file 210 of FIG. 2).

In some embodiments, the service provider computer obtains clustered quiet segments 310 having a length above the period of silence in a typical conversation, which may indicate a scene transition in the associated media file. In some embodiments, the media file may be partitioned into 20-60 loud segments 320 having durations in the range of minutes in length (e.g., between one and thirty minutes), in accordance with the clustered quiet segments 310. For each segment, the service provider computer may partition the media file into corresponding scene files associated with the scene transitions in the audio file 302. For example, scene files may depict one or more action scenes 330, one or more environmental or ambience scenes 340, or one or more dialogue scenes 350. In some embodiments, the movie scene segmentation module (e.g. movie scene segmentation module 220 of FIG. 2) selects only dialogue scenes 350 for processing in downstream modules, such as character recognition module 230-1.

Figure 4:
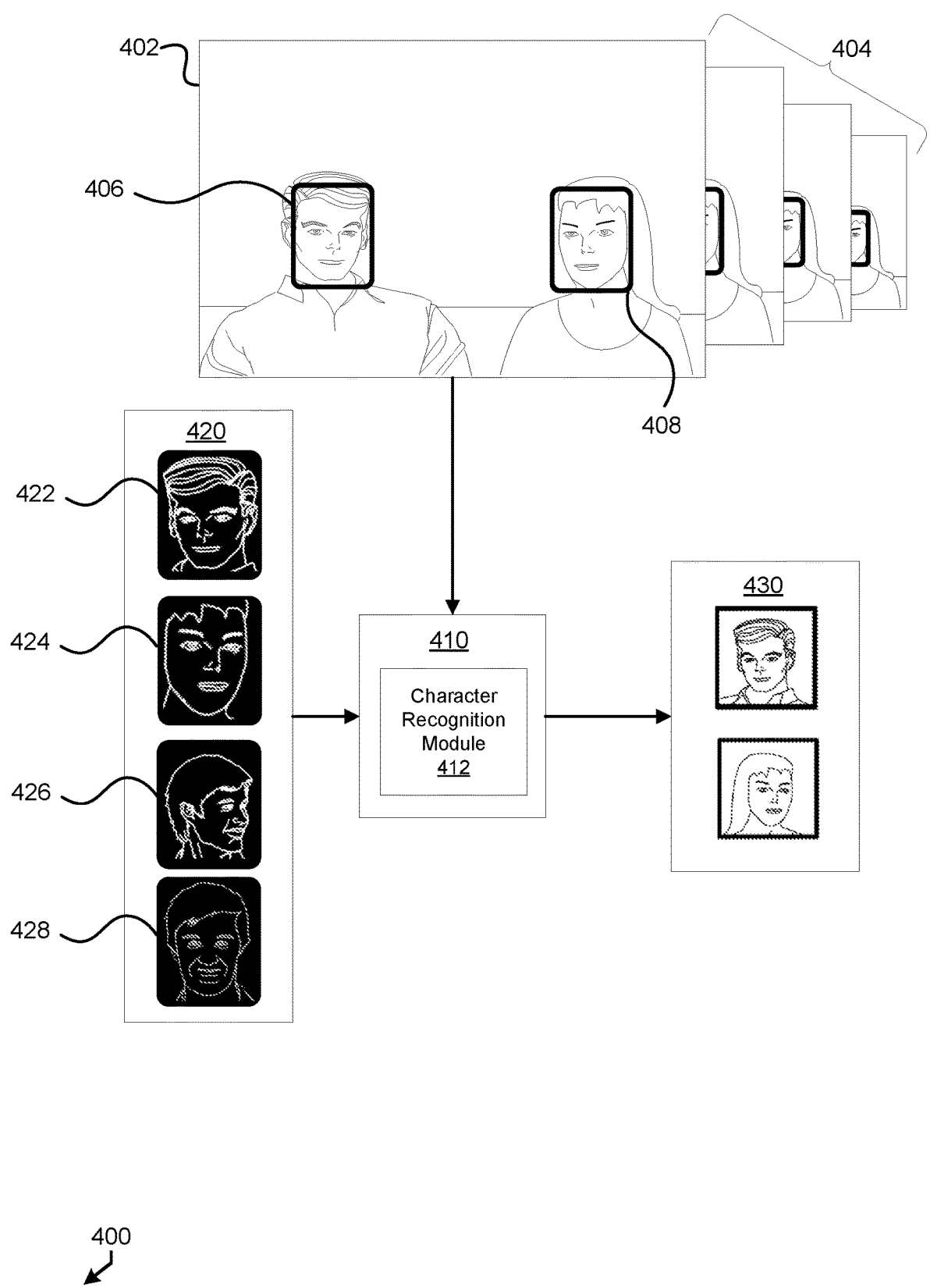
FIG. 4 is a diagram illustrating an example technique for facial detection, recognition, and tracking, in accordance with at least one embodiment.

FIG. 4 is a diagram illustrating an example technique for facial detection, recognition, and tracking, in accordance with at least one embodiment. In some embodiments, the service provider computer processes a scene file 402 (e.g. the dialogue scene file 350 of FIG. 3), in a facial detection, recognition and tracking module 410. The scene file 402 may include one or more frame images in a sequence 404, originally recorded at a frame rate (e.g. 24 frames-per-second or 60 frames-per-second). For example, a scene file 402 associated with a three-minute long dialogue may include as many as 4,320-10,800 frame images in the sequence 404. In some embodiments, the facial detection, recognition and tracking module 410 samples the scene file 402 prior to facial detection by processing a limited number of frame images, according to a sampling rate, thereby reducing the effect of the frame rate on the computational demands of the facial detection, recognition and tracking module 410. For example, the sampling rate may be defined at one frame image per second, thereby setting the number of frame images processed in the facial detection, recognition and tracking module 410, regardless of the frame rate. In some embodiments, the sampling rate may be variable, based at least in part on one or more factors, including but not limited to a measure of the dynamics in the media file (e.g., a scene with many cuts between two or more camera angles may require a dynamic sampling rate to avoid omitting characters), a measure of the audio file (e.g., the service provider computer may detect many characters talking in rapid succession based on an audio file and may determine to sample at a rate correlated at least in part with the change in the number of characters speaking), and a measure of the average length of the scene file (e.g., a shorter-than-average scene file may require a higher sampling rate).

In some embodiments, the facial detection, recognition and tracking module 410 detects one or more faces in one or more frame images sampled from the scene file 402. The faces may be associated with a first facial region 406 and a second facial region 408. In some embodiments, one cast member is depicted in the scene file 402 (e.g. the one or more action scenes 330 and one or more environmental or ambience scenes 340 of FIG. 3). In some embodiments, more than two cast members are depicted in the scene file 402 (not shown in FIGS. 3-4). Alternatively, the facial region 406 may be detected in a crowd of faces (e.g. in a dialogue scene set in a crowded location including, but not limited to, a sporting venue or a restaurant). In some embodiments, the facial detection, recognition and tracking module 410 applies a detection threshold value based at least in part on the size of the face in the frame. In some embodiments, the facial detection, recognition and tracking module 410 may ignore a facial region where the relative size of the facial region to the size of the frame is smaller than the detection threshold value. In some embodiments, the detection threshold value is defined relative to the size of the largest face in the frame (e.g., in wide-angle views the principal characters may all be depicted at small size). As described in reference to FIG. 2, the detection may be limited to faces visible in a minimum number of frame images, analogous to a duration of time in the scene file. For example, the facial detection, recognition and tracking module 410 may limit detection to facial regions detected in at least 30 frames, depending on the sampling rate. In some embodiments, the facial detection is achieved by techniques including, but not limited to, Eigen-face methods, line edge mapping methods, and histogram of oriented gradients methods. In some embodiments, facial detection includes non-human faces, including but not limited to non-human animal faces and anthropomorphized objects.

In some embodiments, the facial detection, recognition and tracking module 410 includes a character recognition module 412. In some embodiments, the character recognition module 412 processes the results of face detection to determine if any faces detected in the scene file 402 are associated with one or more cast members in a metadata file 420 associated with the scene file 402. In some embodiments, the metadata file 420 includes a plurality of image files 422-1-422-3 associated with the characters appearing in a media file associated with the metadata file 420 (e.g. the media file 212 of FIG. 2) as discussed in reference to FIGS. 1-2. In some embodiments, the character recognition module 412 matches the first facial region 406 with a first image file 422-1 of the plurality of image files, thereby recognizing the first facial region 406 as a cast member appearing in the scene file 402. The character recognition module 412 may define a media cast list 430 of cast members recognized in the scene file 402, such that the service provider computer (e.g. the service provider computer 130 of FIG. 1) may generate an entry in a scene list (e.g. the scene list 165 of FIG. 1), containing information identifying cast and characters in the media cast list 430. In some embodiments, the character recognition module 412 determines characters present in a scene file at least in part by analyzing the audio file (e.g. the audio file 302 of FIG. 3) to detect audio signatures linked to characters appearing in the media metadata file.

In some embodiments the character recognition module 412 includes an implementation of a facial recognition algorithm, stored as computer executable instructions in a computer-readable storage medium, as discussed in reference to FIGS. 7-8, below. In some embodiments, the character recognition module 412 implements a local binary pattern histogram ("LBPH") algorithm to detect faces in forward or half-profile. In some embodiments, the LBPH algorithm compares features in the second facial region 402 to features in the plurality of image files 422-1-422-3 to determine a match, by applying a match criterion (e.g. 128-dimensional face recognition applying a Euclidean distance criterion of 0.6 to discern a match between the plurality of images in the metadata file 420 and frame images sampled from the scene file 402). In some embodiments, the character recognition module 412 is trained using the plurality of image files contained in the metadata file 420 (e.g., by supervised learning implemented in a neural network). In some embodiments, the character recognition module 412 is trained using one or more facial recognition datasets collected from classified images of faces including, but not limited to, a database of media metadata (e.g. the database 204 of FIG. 2), and Labeled Faces in the Wild.

Figure 5:
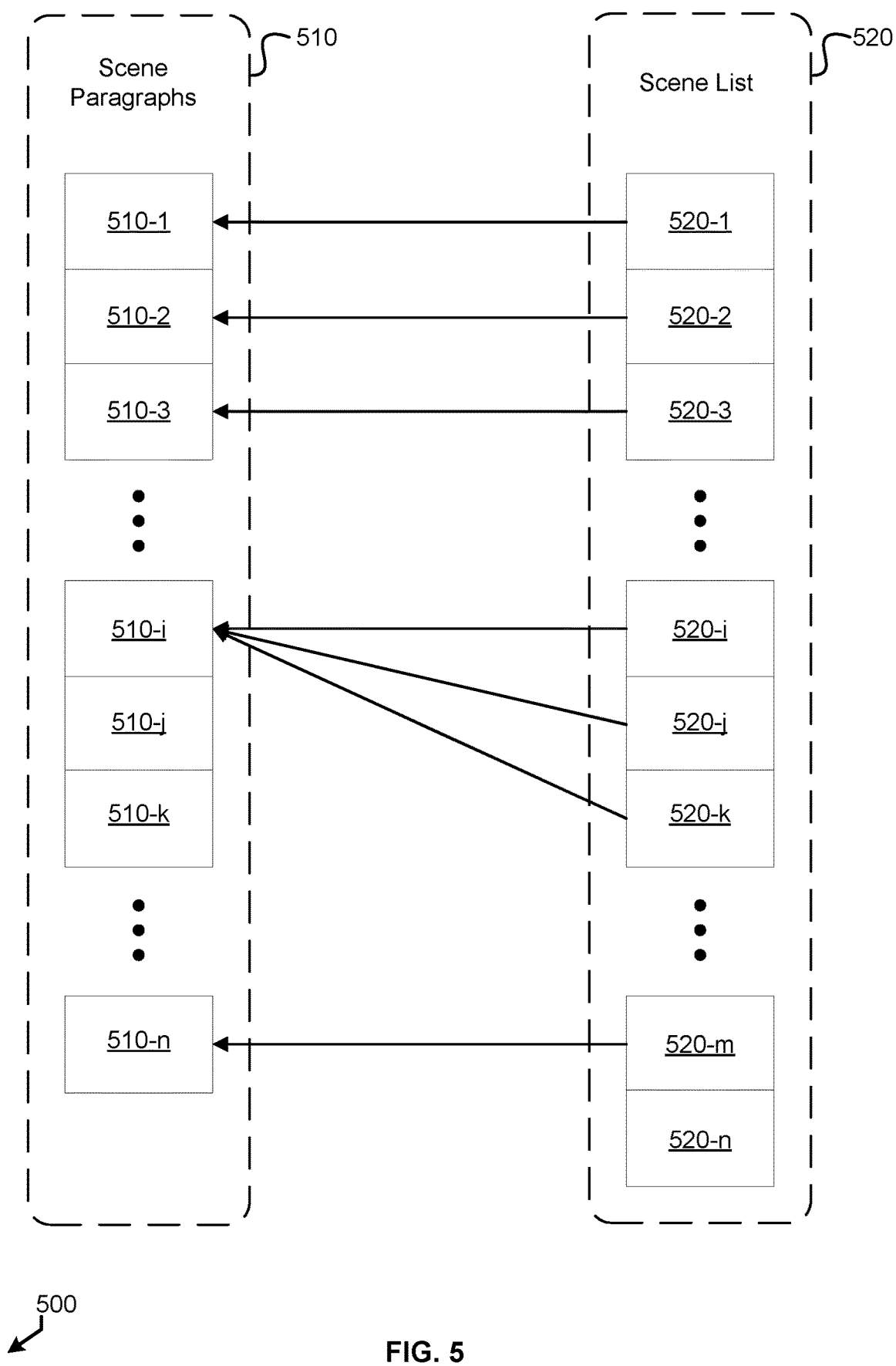
FIG. 5 is another diagram illustrating an example technique for synopsis-asset matching, in accordance with at least one embodiment.

FIG. 5 is a diagram illustrating an example technique for a synopsis-asset matching 500, in accordance with at least one embodiment. In some embodiments, the service provider computer assesses the validity of a title associated with a media file (e.g. the media file 120 of FIG. 1) by implementing a recursive matching algorithm, pairing each scene in the media file with a scene in a textual synopsis contained in a metadata file associated with the title attributed to the media file, as described in reference to FIG. 1. In some embodiments, the textual synopsis is first partitioned into scene paragraphs, and the characters mentioned in the scene paragraphs are identified, to generate an ordered list of scene paragraphs 510 denoted by the major characters appearing in each scene.

In some embodiments the service provider computer determines the transitions between scenes in the textual synopsis by applying a bi-directional transformer model on the entire textual synopsis, implemented in a neural network stored as computer-executable instructions in non-transitory computer memory. The bi-directional transformer model may iteratively apply a pre-trained transformer attention model to the textual synopsis to answer the question "do these two paragraphs describe the same scene," where the model generates a confidence value indicating whether two adjacent paragraphs in the textual synopsis describe the same scene. The pre-training may be implemented by one or more methods including, but not limited to, auto-regressive next word prediction, auto-encoding Masked word prediction, and two sentence agreement. In some embodiments, the bi-directional transformer model may be trained using both Masked LM and Next Sentence Prediction methods to minimize a combined loss function of the combined training strategies. In some embodiments, the bi-directional transformer model training data includes one or more classified textual synopsis files from a metadata database (e.g. database 204 of FIG. 2). In some embodiments, training the bi-directional transformer model occurs over a period of time including, but not limited to, 1-10 hours and 1-5 days.

In some embodiments, the service provider computer identifies the characters mentioned in each scene paragraph by keyword search using a character list from the metadata file. In some embodiments, the synopsis-asset matching technique 500 effects a match by assigning each entry in a scene list 520 to a scene paragraph in the ordered list of scene paragraphs 510. In some embodiments, the service provider computer compares a first entry 520-1 in the scene list 520 with a first scene paragraph 510-1, to assess congruence of the characters identified. In some embodiments, the number of scene paragraphs in the ordered list of scene paragraphs 510 and the number of entries in the scene list 520 are unequal. In some embodiments, a second entry 520-2 is compared against each unmatched entry in the scene list 520, starting with the first, followed by matched entries, until it is matched with a second scene paragraph 520-2. In some embodiments, a single scene paragraph **510-*i* is matched with multiple entries (e.g. entries 520-*i*-520-*j*) in the scene list 520, where "i," "j," "k," "m," and "n" are integer numbers greater than zero. In some embodiments, the scene list 520 may contain more entries than the number of scene paragraphs, such that the last scene paragraph 510-*n* is matched with an entry 520-*m* that is not the last entry 520-*n* in the scene list 520**.

In some embodiments, the synopsis-asset matching technique 500 includes generating a paragraph-scene score and a final score to determine the quality of the match and the validity of the asset-synopsis agreement, respectively. In some embodiments, the paragraph scene score is determined based at least in part on the assignments made during the match, and is calculated dynamically as a match is modified, for example, during recursion. In some embodiments, the paragraph scene score is calculated for each paired entry and scene paragraph, by taking the difference between the number of characters in the scene paragraph and the number of those characters present in the matched entry in the scene list 520, dividing the result by the total number of characters identified in the synopsis. The scene paragraph score for each synopsis paragraph—scene list entry match is summed cumulatively, and the sum score acts as a minimization criterion for iteration of the matching algorithm. For example, alternative matching arrangements of scene list entries to scene paragraphs may be iterated to minimize the sum score. In some embodiments, the final score is determined, at least in part, by dividing the minimized sum score by the number of scene paragraphs in the textual synopsis. In some embodiments, the service provider computer validates the asset-synopsis agreement by comparing the final score to a pre-defined threshold value. In some embodiments, the threshold value is a number between zero and one, for example, 0.1, 0.2, 0.3, 0.4, 0.5, and the like. In some embodiments, if the final score exceeds the threshold value, the service provider computer determines disagreement between the media file and the associated metadata, and modifies the title accordingly. In some embodiments, the final score does not exceed the threshold value, in response to which the service provider computer confirms the title. In some embodiments, the threshold value is defined in another form including, but not limited to a negative number, a high-pass threshold, an index score out of 100 points, and/or, confidence interval, such that the final score is calculated in a corresponding format.

The processes and systems described herein may be an improvement on conventional asset validation of media files. For example, conventional methods for validating metadata associated with media files include manually identifying characters in a media file, manually identifying scenes in the media file, and manually matching scenes from a synopsis to scenes in the media file. As many different media files can exist that include recurring characters and plot lines, the manual identification can be a time consuming and expensive process that still results in errors. Further, a single misattributed title or metadata association error in an episodic series of media files may necessitate manual verification of an entire library of media files, compounding the problem. As media file databases increase in size, bottlenecks may occur in the manual identification processes. However, the methods and systems described herein utilize an identification and verification process that can efficiently and automatically verify media files in a fraction of the time required for manual validation and at a fraction of the expense.

Figure 6:
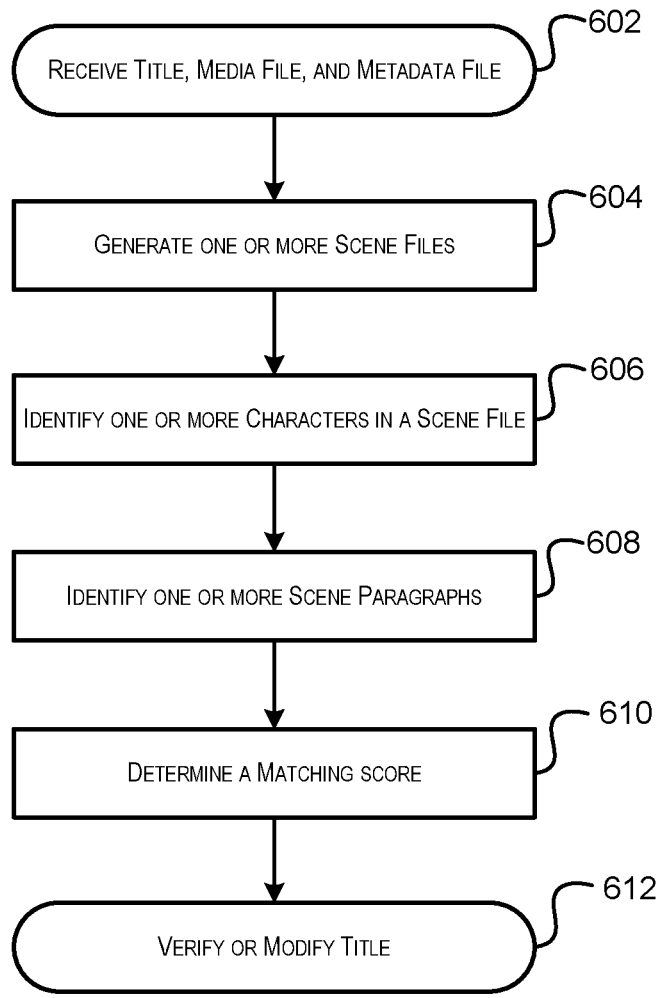
FIG. 6 is a flowchart illustrating an example of a process for content validation according to certain embodiments.
Figure 7:
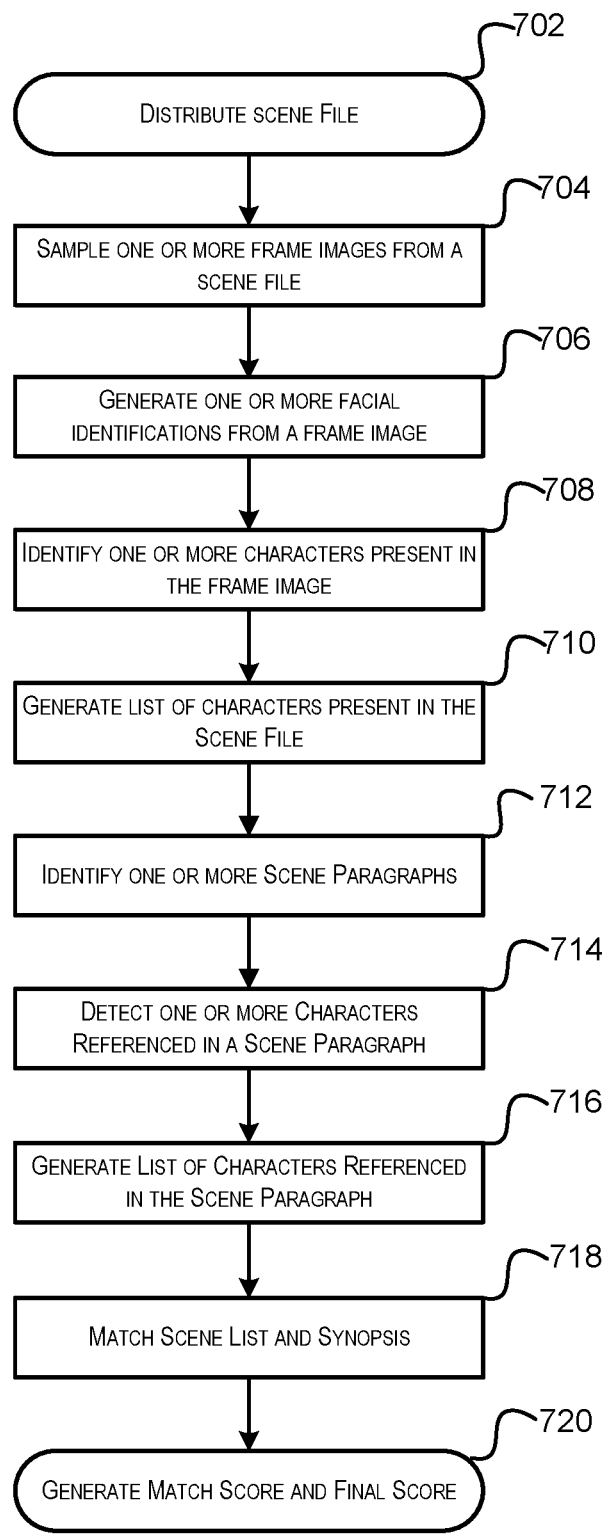
FIG. 7 is another flowchart illustrating an example of a process for content validation according to certain embodiments.

FIGS. 6 and 7 illustrate example flow charts for automated validation techniques, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

FIG. 6 is a flowchart illustrating an example of a process for content validation 600 according to certain embodiments. Process 600 may begin with operation 602 to receive a title of a media file, for example, by a computer system in communication with a database of media files, as discussed in reference to FIG. 2. In operation 602, the computer system may receive a media file associated with the title, and a metadata file associated with the title. The metadata file may be received from a database of metadata files, while the media file may be received from a database of media files (e.g. a cloud-based online media content library). The metadata file may include a plurality of image files, associated with characters appearing in the media file, as described in reference to FIGS. 1-5.

In operation 604 the computer system may detect scenes in the media file, and may partition the media file into scene files, such that each scene file corresponds to a scene in the media file. As discussed in reference to FIGS. 1-5, the computer system may generate an audio file and a video file from the media file, and further may segment the audio file into quiet and loud segments, smoothed at least in part according to a smoothing window corresponding to the typical length of a scene transition in the media file. The computer system may partition the video file into scene files corresponding to the loud segments in the audio-file.

In operation 606, the computer system performs facial detection, recognition, and tracking on a sampled scene file as described in reference to FIG. 2. In some embodiments, the computer system detects facial features, matches the facial features to images included in the metadata file, and generates a list of recognized characters in the scene file.

In operation 608, the computer system generates a scene list based, at least in part, on data included in the metadata file, as described in reference to FIGS. 1, 2, and 5. The computer system may determine scenes in a textual synopsis, such that the computer system generates a list of scene paragraphs corresponding to the scenes in the metadata file. In some embodiments, the computer system identifies characters mentioned in the scene paragraphs, and appends that information to the list of scene paragraphs.

In operation 610, the computer system matches the media file to the metadata file at least in part by matching each entry in the scene list with a scene paragraph in the list of scene paragraphs. In some embodiments, the computer system iterates the match arrangement such that the match arrangement is optimized at least in part according to a match score. In some embodiments, the match score forms the basis for a validity criterion.

In operation 612, the computer system compares the validity criterion against a pre-defined threshold value. In some embodiments, the computer system modifies the title attribution at least in part in response to the validity criterion crossing or exceeding the pre-defined threshold value.

FIG. 7 is another flowchart illustrating an example of a process for content validation 700 according to certain embodiments. Process 700 may begin with operation 702, where the computer system distributes scene files to one or more scene character recognition modules, where the modules may be parallelized implementations of the algorithms described in reference to FIGS. 2-5, implemented in one or more processors of the computer system. In some embodiments, the operation 702 preserves the original sequence of scene files by generating a list of timestamps corresponding to the sequence position of each respective scene file in the original media file. In operation 704, the computer system samples one or more frame images from a scene file, as described in reference to FIG. 2.

In operation 706, the computer system performs facial detection, recognition, and tracking on a sampled scene file as described in reference to FIG. 2 and FIG. 4. In some embodiments, the computer system detects facial features, matches the facial features to images included in the metadata file, and identifies principal characters in the scene file based at least in part on a duration criterion. In some embodiments, the computer system limits detection to faces appearing for a minimum time or in a minimum number of sampled frame images, as described in reference to FIG. 4. In operation 708, the computer system generates a cast list associated with the scene file describing the principal actors recognized in the scene file. In operation 710, the computer system assembles the cast lists generated in operation 708 into a scene list, as described in reference to FIGS. 1, 2 and 5.

In operation 712, the computer system identifies one or more scene paragraphs in a textual synopsis included in the metadata file, as described in reference to FIG. 5. In some embodiments, the computer system may implement a pre-trained bi-directional transformer model to detect scene transitions in the textual synopsis, at least in part to determine which of the textual paragraphs included in the textual synopsis together describe a single scene.

In operation 716, the computer system generates a cast list for the scene paragraphs, as described in reference to FIGS. 2 and 5. In some embodiments, the computer system generates the cast list by identifying characters mentioned in the one or more scene paragraphs, based at least in part on keyword search based at least in part on a cast list included in the metadata file.

In operation 718, the computer system matches the scene list and the scene paragraphs from the textual synopsis, as described in reference to FIGS. 2 and 5. In some embodiments, the computer system iterates a recursive matching algorithm, whereby each entry in the scene list is matched to a scene paragraph in the synopsis, based at least in part on concurrence of principal characters appearing in the associated scene file and mentioned in the scene paragraph. In operation 720, the computer system generates a match score for each match, as described in reference to FIG. 5. A sum score may be based, at least in part, on the cumulative addition of match scores, which may be used as a basis for an optimization criterion to determine match convergence.

In some embodiments, the sum score is compared to a pre-defined threshold score. In some embodiments, the computer determines convergence of the matching algorithm based at least in part on higher-order dynamics associated with the sum score (e.g., based on a trend in the match score in addition to the match score itself). In operation 720, the computer system generates a final score based in part on the sum score, as described in reference to FIG. 5, and compares the final score to a pre-defined threshold value, as described in reference to FIG. 6.

Figure 8:
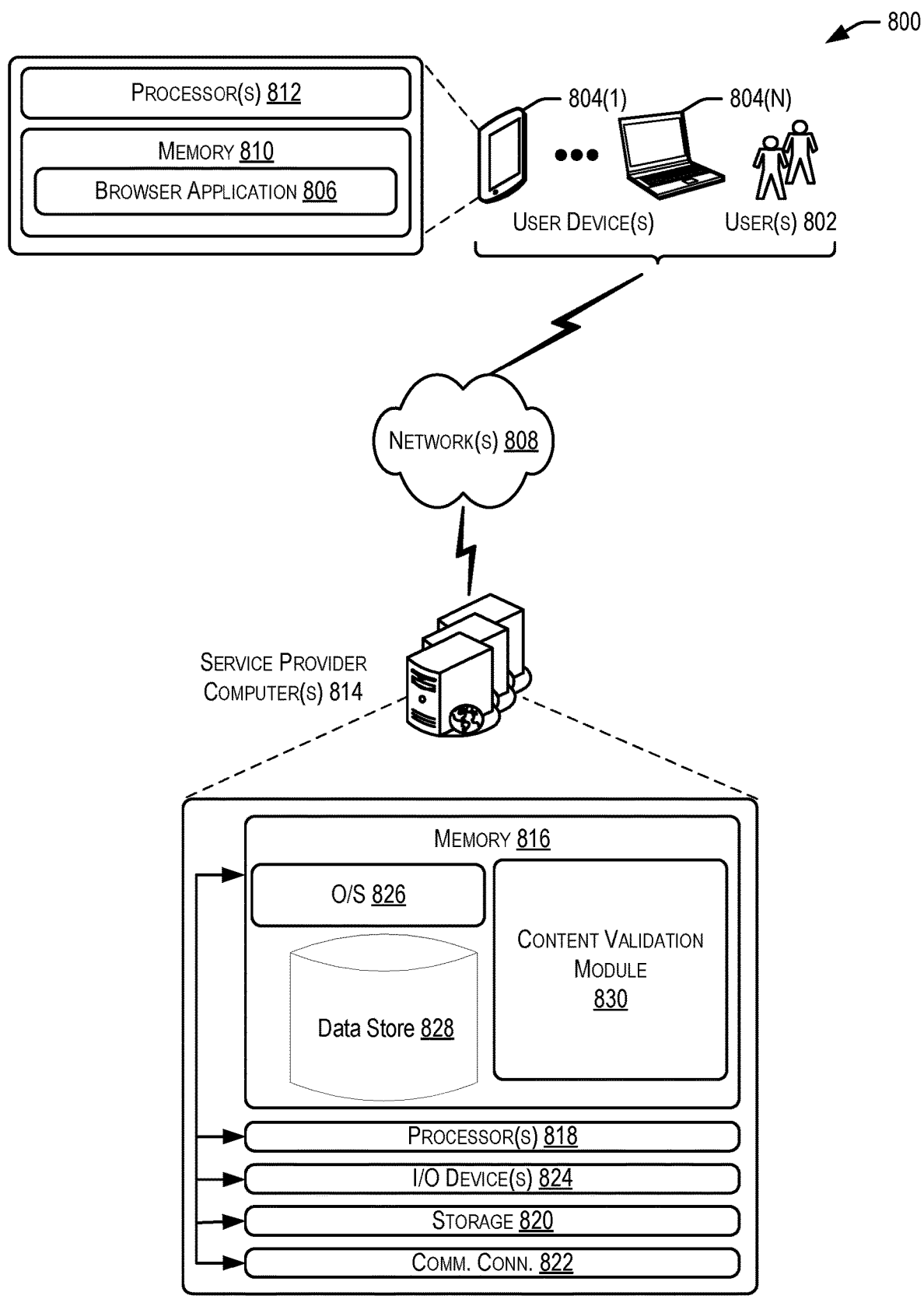
FIG. 8 is a diagram illustrating an example architecture for implementing an automated content validation technique, in accordance with at least one embodiment.

FIG. 8 is a diagram illustrating an example architecture 800 for implementing an automated content validation technique, in accordance with at least one embodiment. In architecture 800, one or more users 802 (e.g., customers, users, consumers, etc.,) may utilize user computing devices 804(1)-(N) (collectively, user devices 804) to access a browser application 806 or a user interface (UI) accessible through the browser application 806, via one or more networks 808. The "browser application" 806 can be any browser control or native application that can access and display a network page or other information such as a user interface of a native software application for enabling the selection or interaction of content. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806.

The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the techniques disclosed herein. Additionally, the memory 810 may include one or more modules for implementing the techniques described herein including a content validation module 830.

The architecture 800 may also include one or more service provider computers 814 that may, in some examples, provide computing resources such as, but not limited to, client entities, low latency data storage, durable data store, data access, management, virtualization, hosted computing environment or "cloud-based" solutions, electronic content performance management, etc. The service provider computers 814 may implement or be an example of the service provider computer(s) described herein with reference to FIGS. 1-6 and throughout the disclosure. The one or more service provider computers 814 may also be operable to provide site hosting, computer application development, and/or implementation platforms, combinations of the foregoing, or the like to the one or more users 802 via user devices 804.

In some examples, the networks 808 may include any one or a combination of many different types of networks, such as cable networks, the Internet, wireless networks, cellular networks, and other private and/or public networks. While the illustrated examples represents the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the techniques disclosed herein including the content validation module 830. In accordance with at least one embodiment, the content validation module 830 may be configured to at least process media files to separate the media files into audio files and video files, segment the audio file into scene segments, partition the video file into scene files corresponding to the scene segments in the audio file, detect and recognize facial regions in the scene files, identify characters and cast appearing in each of the scene files for a minimum period, generate a scene list describing of cast and characters appearing in the scene files, identify one or more scene paragraphs in a textual synopsis from metadata, identify characters mentioned in each of the one or more scene paragraphs, match each entry in the scene list to a scene paragraph, determine a validity criterion based in part on the quality of the match, and modifying the title in response to the validity criterion exceeding a pre-defined threshold value. In embodiments, the content validation module 830 may be configured to automatically validate the title attributed to the media file based at least in part on data from a database of media files. Identifying based at least in part on data may include a determination that one or more media files associated with the media file have been misattributed. Additionally, the identifying based at least in part on data may include receiving a title in response to identification by a user (e.g. the user(s) 802 of FIG. 8) that the title is misattributed. The content validation module 830 may be configured to validate title attributions autonomously, selecting and processing media files independently or in communication with one or more automated systems. In accordance with at least one embodiment, the service provider computers 814 and content validation module 830 may be configured to store data associated with validation operations (e.g. datasets detailing identifying information of media files having misattributed titles) in data store 828 or, via networks 808, to distributed data storage systems (e.g. cloud storage systems).

Figure 9:
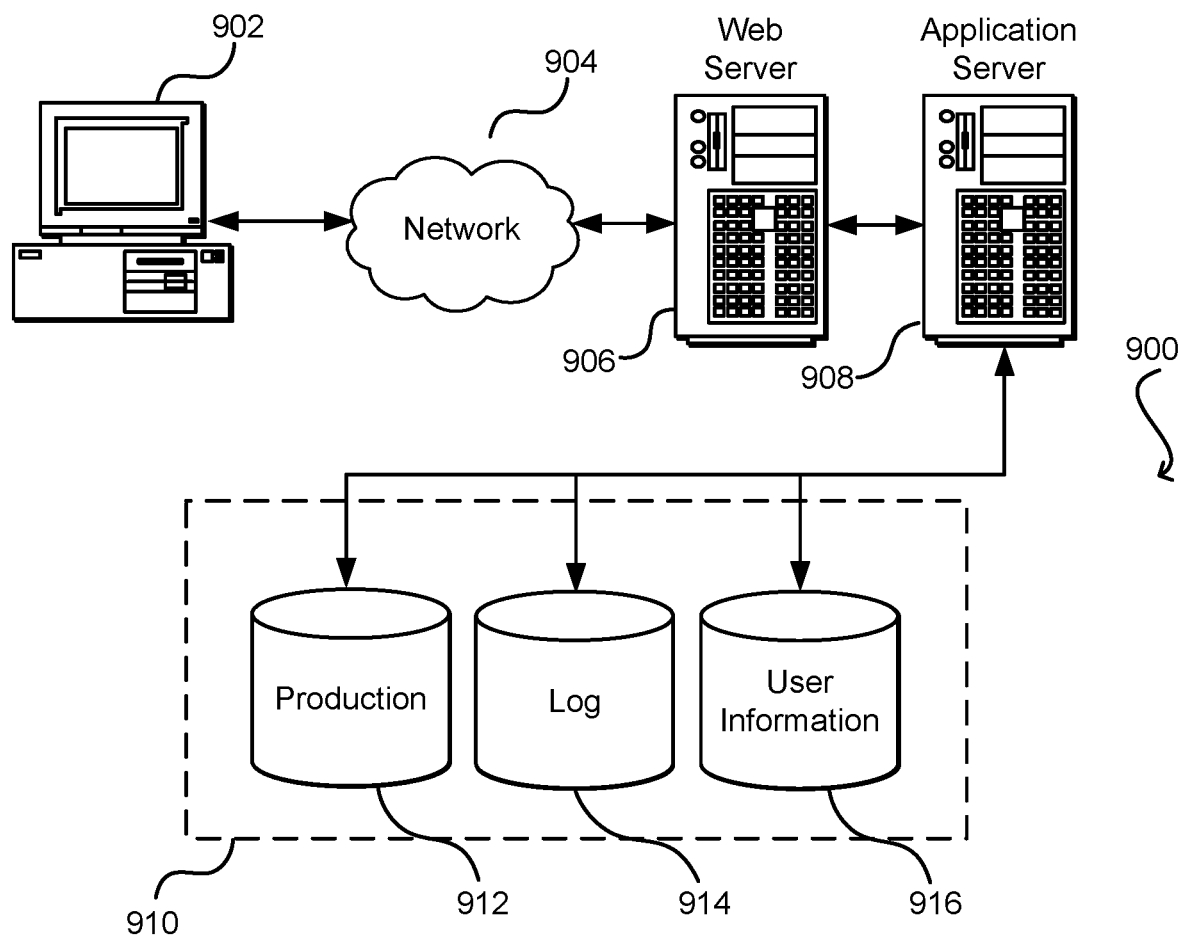
FIG. 9 is a diagram illustrating aspects of an example environment for implementing aspects in accordance with various embodiments.

FIG. 9 is a diagram illustrating aspects of an example environment for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising: under control of a computer system, executing instructions for:
   generating, by the computer system, from a metadata file associated with a media file, a plurality of metadata image files, a one or more of scene paragraphs, and a list of characters referenced in a given scene paragraph of the one or more scene paragraphs;
   generating, by the computer system, an audio file and a video file from the media file;
   identifying, by the computer system, one or more segments in the audio file;
   partitioning, by the computer system, the video file into one or more scene files based at least in part on the one or more segments;
   identifying, by the computer system, one or more characters of the list of characters present in a scene file of the one or more scene files, the identifying being based at least in part on one or more of the plurality of metadata image files;
   in response to identifying the one or more characters present in the scene file, determining, by the computer system, a match score based at least in part on an association of the scene file to a scene paragraph of the one or more scene paragraphs;
   determining, by the computer system, a validity criterion for a title associated with the media file based at least in part on the match score; and
   in response to the validity criterion crossing a threshold value, modifying, by the computer system, the title.

2. The computer-implemented method of claim 1, wherein matching a scene file of the one or more scene files to a given scene paragraph of the one or more scene paragraphs is based at least in part on comparing the one or more characters identified in the scene file to the list of characters referenced in the given scene paragraph.

3. The computer-implemented method of claim 1, wherein generating the one or more scene paragraphs includes identifying scenes in a textual synopsis included in the metadata file based at least in part on a transformer model implemented in a neural network.

4. The computer-implemented method of claim 1, further comprising distributing the one or more scene files to a plurality of image processors for parallel processing.

5. A system, comprising:
   a memory to store computer-executable instructions; and
   one or more processors, in communication with the memory, to execute the computer-executable instructions to:
   receive a media file;
   receive a metadata file associated with a title of the media file;
   identify one or more scene paragraphs of one or more scene paragraphs based at least in part on information in the metadata file;
   generate one or more scene files from the media file;
   identify one or more characters in a scene file of the one or more scene files;
   in response to identifying the one or more characters in the scene file, determining a match score based at least in part on an association of the scene file to a scene paragraph of the one or more scene paragraphs; and
   determine a validity criterion for the title associated with the media file based at least in part on the match score.

6. The system of claim 5, wherein identifying the one or more characters comprises:
   sampling one or more frame images from the scene file according at least in part to a sampling rate;
   generating one or more facial identifications from a frame image of the one or more frame images; and
   identifying one or more characters present in the frame image based at least in part on matching a facial identification of the one or more facial identifications to one or more metadata image files included in the metadata file.

7. The system of claim 5, wherein identifying the one or more scene paragraphs further comprises identifying scenes in a textual synopsis included in the metadata file at least in part by using a transformer model implemented in a neural network.

8. The system of claim 5, wherein identifying the one or more scene paragraphs comprises:
   detecting one or more characters referenced in a scene paragraph of the one or more scene paragraphs; and
   generating a list of characters referenced in the scene paragraph.

9. The system of claim 8, wherein determining the match score comprises comparing the one or more characters identified in the scene file to the list of characters referenced in the scene paragraph.

10. The system of claim 9, wherein determining the match score further comprises:
    determining a final score based at least in part on the minimum match score;
    comparing the final score to a threshold value; and
    in response to the final score crossing the threshold value, rejecting the association of the title with the media file.

11. The system of claim 5, wherein generating one or more scene files from the media file comprises:
    generating an audio file and a video file from the media file;
    detecting one more periods of silence in the audio file; and
    partitioning the video file into one or more scene files, based at least in part on the one or more periods of silence in the audio file.

12. The system of claim 5, wherein determining the match score comprises determining a minimum match score based at least in part on determining a second association of the scene file of the one or more scene files to a second scene paragraph of the one or more scene paragraphs, calculating a second match score, and comparing the second match score to the match score.

13. The system of claim 5, wherein the one or more processors are further configured to at least modify the metadata associated with the media file based at least in part on the validity criterion.

14. A non-transitory computer-readable storage medium storing computer-executable instructions that, when executed by a computer system, configure-the computer system to perform operations comprising:
receiving a media file;
receiving a metadata file associated with a title of the media file;
identifying one or more scene paragraphs based at least in part on information in the metadata file;
generating one or more scene files from the media file;
identifying one or more characters in the scene file;
in response to identifying the one or more characters in the scene file, determining a match score based at least in part on an association of the scene file to a scene paragraph of the one or more scene paragraphs; and
determining a validity criterion for the title associated with the media file based at least in part on the match score.

15. The computer-readable storage medium of claim 14, wherein identifying a one or more scene paragraphs comprises:
identifying one or more scenes in a textual synopsis, at least in part by using a transformer model implemented in a neural network; and
in response to identifying the one or more scenes in the textual synopsis, determining a list of characters appearing in a scene of the one or more scenes.

16. The computer-readable storage medium of claim 15, wherein determining a match score comprises:
associating a scene file of the one or more scene files to a first scene paragraph of the one or more scene paragraphs, based at least in part on comparing the one or more characters identified in the scene file to the list of characters;
generating a first value based at least in part on the comparing; and
optimizing the match score at least in part by associating the scene file to a second scene paragraph of the one or more scene paragraphs, generating a second value based at least in part on the associating the scene file to a second scene paragraph, and comparing the first value to the second value.

17. The computer-readable storage medium of claim 14, wherein identifying one or more characters in the scene file comprises:
sampling the scene file to extract a subset of scene images, according to a sampling rate; and
detecting one or more characters present in a scene image of the subset of scene images, based at least in part on information in the metadata file.

18. The computer-readable storage medium of claim 14, wherein generating one or more scene files from the media file comprises:
generating an audio file and a video file from the media file;
detecting one more periods of silence in the audio file; and
partitioning the video file into one or more scene files, based at least in part on the one or more periods of silence in the audio file.

19. The computer-readable storage medium of claim 14, wherein the operations further comprise rejecting the association of the title with the media file in response to the validity criterion crossing a threshold value.

20. The computer-readable storage medium of claim 14, wherein the operations further comprise modifying the metadata file based at least in part on the validity criterion.

* * * * *